(12) United States Patent
Teeter et al.

(10) Patent No.: US 10,938,479 B1
(45) Date of Patent: Mar. 2, 2021

(54) OPTICAL TRANSCEIVER SYSTEM

(71) Applicant: Dell Products L.P., Round Rock, TX (US)

(72) Inventors: Victor Teeter, Round Rock, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/929,527

(22) Filed: May 7, 2020

(51) Int. Cl.
*H04B 10/00* (2013.01)
*H04B 10/40* (2013.01)
*G02B 6/42* (2006.01)
*H04J 14/00* (2006.01)

(52) U.S. Cl.
CPC .......... *H04B 10/40* (2013.01); *G02B 6/4284* (2013.01)

(58) Field of Classification Search
CPC .............................. H04B 10/40; H04B 10/43
See application file for complete search history.

(56) References Cited

U.S. PATENT DOCUMENTS

2009/0297159 A1\* 12/2009 Margolin ............ G02B 6/4251
398/135

\* cited by examiner

*Primary Examiner* — Daniel G Dobson
(74) *Attorney, Agent, or Firm* — Haynes and Boone, LLP

(57) ABSTRACT

An optical transceiver system includes an optical transceiver chassis having a cable connector, a laser subsystem, and a laser shield system that is adjacent the cable connector. The laser shield system blocks a laser emitted by the laser subsystem when no cable is connected to the cable connector. In response to engagement with a transceiver connector on a cable, the laser shield system moves in order to allow the transceiver connector to connect to the cable connector.

12 Claims, 18 Drawing Sheets

OPTICAL TRANSCEIVER SYSTEM

BACKGROUND

The present disclosure relates generally to information handling systems, and more particularly to optical transceivers used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems including switch devices or other networking devices known in the art sometimes utilize optical transceiver devices such as, for example, Quad Small Form-factor Pluggable (QSFP) optical transceiver devices. Many optical transceiver devices provide a compact, hot-pluggable network interface module for use in data communications, and may be connected to a port on the switch device, with a fiber optic cable connected to the optical transceiver device. Electrical data signals received by the optical transceiver device from the switch device may then be converted to optical signals using a laser subsystem in the optical transceiver device, and the optical signals provided by that laser subsystem may be directed by the optical transceiver device through optical fibers in the fiber optic cable. However, conventional optical transceivers activate their laser subsystem by default in response to being connected to the port on the switch device, which can raise some issues. For example, the laser produced by the laser subsystem can escape the optical transceiver device when a fiber optic cable is not plugged into the optical transceiver device, as the laser subsystem covers (also called "dust cover") that are provided with optical transceivers are often discarded once the optical transceiver device is connected to the port on the switch device, which can present a danger to the eyes of users.

Accordingly, it would be desirable to provide an optical transceiver system that addresses the issues discussed above.

SUMMARY

According to one embodiment, an Information Handling System (IHS) includes a first optical connector; a laser subsystem that is configured to emit a laser from the first optical connector; and a laser shield system that is located adjacent the first optical connector and that is configured to: block, when no cable is connected to the first optical connector, the laser emitted by the laser subsystem; and move, in response to engagement with a second optical connector on a cable, in order to allow the second optical connector to connect to the first optical connector.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
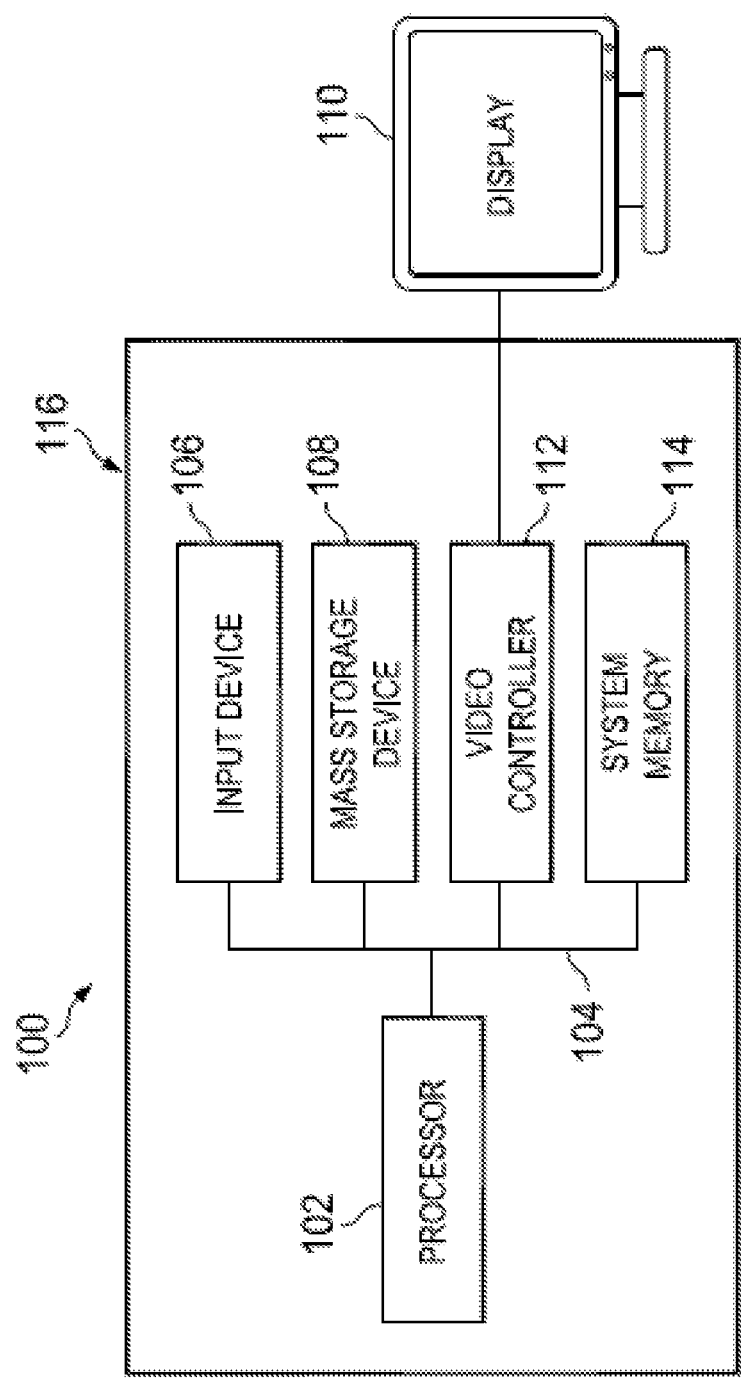
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
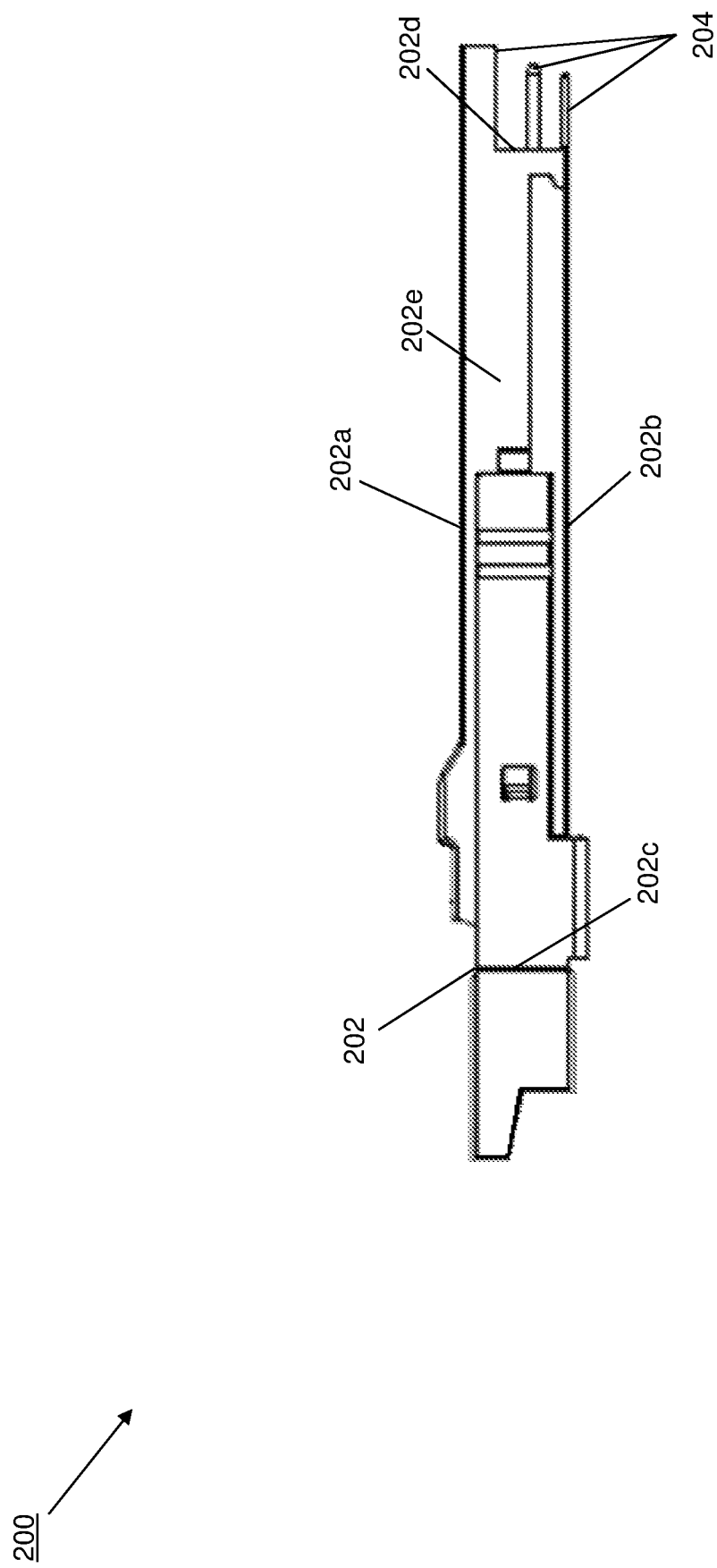
FIG. 2 is a side view illustrating an embodiment of an optical transceiver device.

Referring now to FIG. 2, an embodiment of an optical transceiver device 200 is illustrated that may include the optical transceiver system of the present disclosure. In the illustrated embodiment, the optical transceiver device 200 includes an optical transceiver chassis 202 having a top surface 202a, a bottom surface 202b that is located opposite the optical transceiver chassis 202 from the top surface 202a, a front surface 202c that extends between the top surface 202a and the bottom surface 202b, a bottom surface 202d that is located opposite the optical transceiver chassis 202 from the front surface 202c and that extends between the top surface 202a and the bottom surface 202b, and a pair of opposing side surfaces (with the side surface 202e illustrated in FIG. 2) that are located opposite the optical transceiver chassis 202 from each other and that extend between the top surface 202a, the bottom surface 202b, the front surface 202c, and the rear surface 202d. In the illustrated embodiment, the optical transceiver device 200 also includes a computing device connector 204 that extends from the rear surface 202d.

As discussed in further detail below, the optical transceiver device 200 may be configured to connect (e.g., via the computing device connector 204) to a port on the IHS 100 discussed above with reference to FIG. 1, as well as to other computing devices such as switch devices or other networking devices known in the art, in order to provide for the conversion of electrical data signals to optical data signals, and the transmission of those optical data signals. As such, while not illustrated and/or described with element numbers in FIG. 2, one of skill in the art in possession of the present disclosure will appreciate that the optical transceiver device 200 and/or optical transceiver chassis 202 may include any of a variety of optical transceiver components (e.g., computing device coupling features, heat sinks, etc.) that would be apparent to one of skill in the art in possession of the present disclosure in addition to those explicitly described below. Furthermore, while one of skill in the art in possession of the present disclosure will recognize that the optical transceiver device 200 is illustrated and described as a Small Form-factor Pluggable (SFP) optical transceiver device (e.g., a Quad SFP+(QSFP+) optical transceiver device), one of skill in the art in possession of the present disclosure will appreciate that other optical transceiver devices will benefit from the teachings of the present disclosure and thus will fall within its scope as well.

Figure 3A:
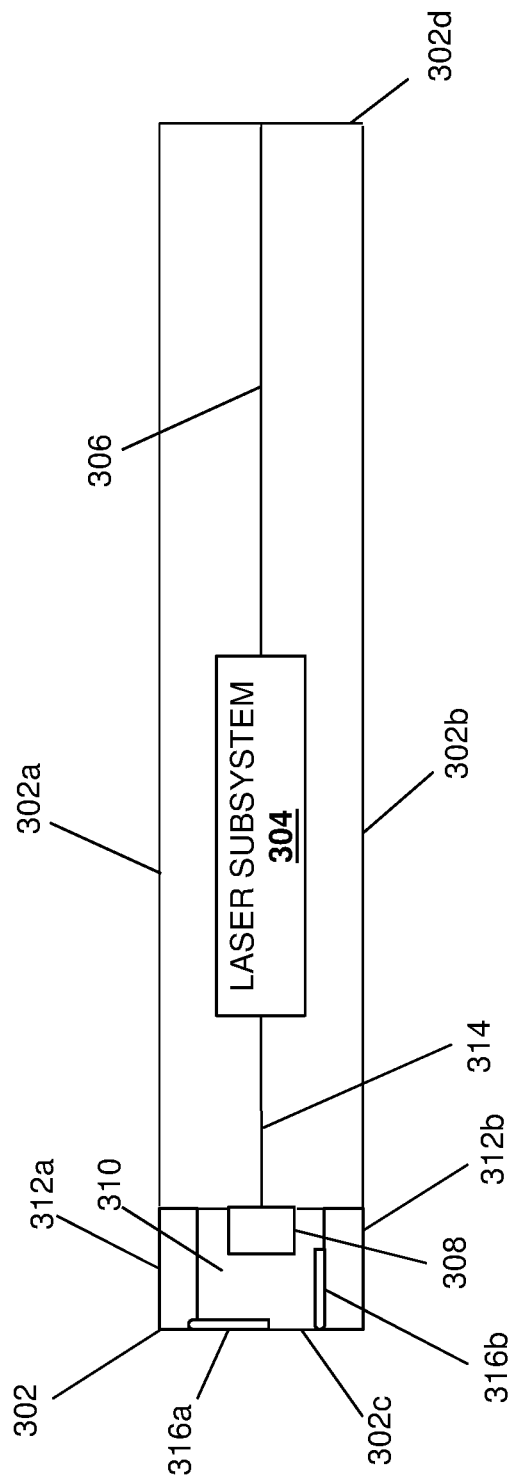
FIG. 3A is a schematic view illustrating an embodiment of the optical transceiver device of FIG. 2.
Figure 3B:
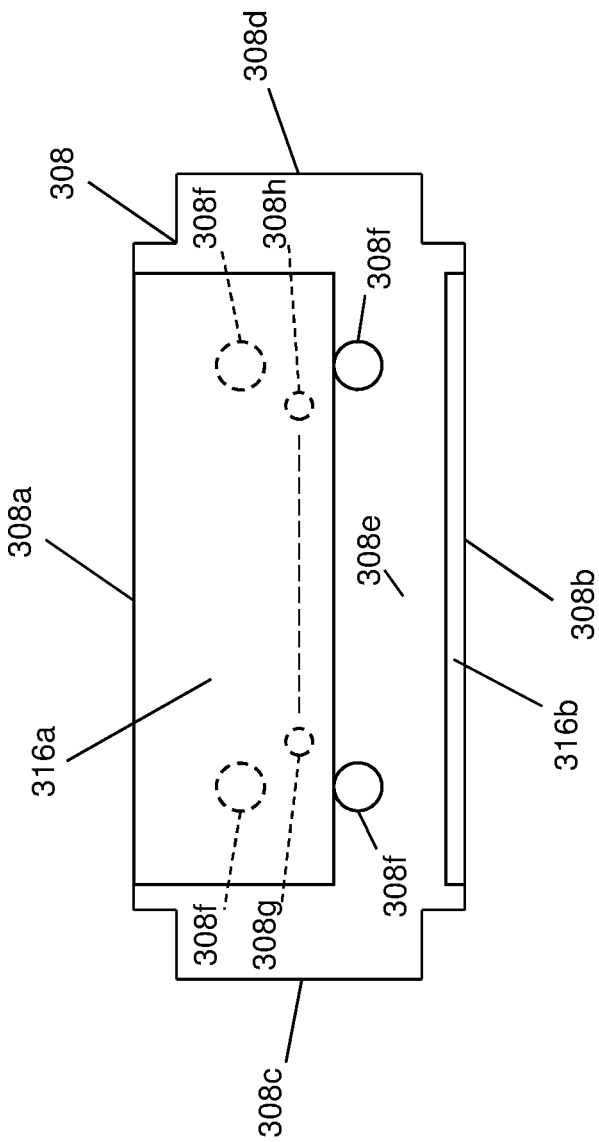
FIG. 3B is a schematic view illustrating an embodiment of an optical connector on optical transceiver device of FIG. 3A.

Referring now to FIGS. 3A and 3B, an embodiment of an optical transceiver device 300 is illustrated that may provide the optical transceiver device 200 discussed above with reference to FIG. 2, and one of skill in the art in possession of the present disclosure will recognize that the embodiment of the optical transceiver device 300 illustrated in FIG. 3A includes an optical transceiver chassis that is similar to the optical transceiver chassis 202 discussed above with reference to FIG. 2, while omitting a computing device connector (similar to the computing device connector 204 discussed above with reference to FIG. 2) for clarity of illustration and discussion. As such, the optical transceiver device 300 may include an optical transceiver chassis 302 having a top surface 302a, a bottom surface 302b that is located opposite the optical transceiver chassis 302 from the top surface 302a, a front surface 302c that extends between the top surface 302a and the bottom surface 302b, a rear surface 302d that is located opposite the optical transceiver chassis 302 from the front surface 302c and that extends between the top surface 302a and the bottom surface 302b, and a pair of opposing side surfaces (not illustrated in FIG. 3A) that are located opposite the optical transceiver chassis 302 from each other and that extend between the top surface 302a, the bottom surface 302b, the front surface 302c, and the rear surface 302d. Thus, one of skill in the art in possession of the present disclosure will appreciate that the optical transceiver chassis 302 and its top surface 302a, bottom surface 302b, front surface 302c, and rear surface 302d (as well as its unillustrated side surfaces) may correspond to the optical transceiver chassis 200 and its respective top surface 202a, bottom surface 202b, front surface 202c, and rear surface 202d (as well as its side surface 202e and unillustrated side surface.)

In the illustrated embodiment, the optical transceiver chassis 302 houses a laser subsystem 304 that may include any laser subsystem components that are configured to emit a laser as discussed below, as well as any laser subsystem controller components known in the art. As such, while not illustrated in FIG. 3A, one of skill in the art in possession of the present disclosure will recognize that the optical transceiver chassis 302 may house a variety of other laser subsystem components and controller components for providing the laser subsystem functionality discussed below while remaining within the scope of the present disclosure as well. As illustrated, the laser subsystem 304 may be coupled via a coupling 306 to a computing device connector (e.g., similar to the computing device connector 204 discussed above with reference to FIG. 2) that extends from the rear surface 302d of the optical transceiver device 300.

In the illustrated embodiment, the optical transceiver chassis 302 also includes a cable connector 308 (e.g., an optical connector that is configured to connect to a fiber optic connector on a fiber optic cable, as discussed above) that is located in a cable connector housing 310 that is defined between the front surface 302c of the optical transceiver chassis 302, an optical transceiver chassis wall 312a that provides a portion of the top surface 302a of the optical transceiver chassis 302, and an optical transceiver chassis wall 312b that provides a portion of the bottom surface 302b of the optical transceiver chassis 302. FIG. 3B illustrates an embodiment of the cable connector 308 that includes a top edge 308a, a bottom edge 308b that is located opposite the cable connector 308 from the top edge 308a, a pair of side edges 308c and 308d that are located opposite the cable connector 308 from each other and that extend between the top edge 308a and the bottom edge 308b, and a front surface 308e that extends between the top edge 308a, the bottom edge 308b, and the side edges 308c and 308d. The cable connector 308 illustrated in FIG. 3B includes a plurality of alignment elements 308f that are included on the front surface 308e of the cable connector 308, an optical data signal transmission element 308g that is included on the front surface 308e of the cable connector 308, and an optical data signal receiving element 308h that is included on the front surface 308e of the cable connector 308. As will be appreciated by one of skill in the art in possession of the present disclosure, the alignment elements 308f may be configured to engage a transceiver connector on a cable in order to align fiber optical cabling in the cable and accessible on the transceiver connector with the optical data signal transmission element 308g and the optical data signal receiving element 308h. Furthermore, while not explicitly illustrated in FIGS. 3A and 3B, one of skill in the art in possession of the present disclosure will appreciate that the cable connector 308 may include a variety of other features (e.g., transceiver connector securing features, etc.) while remaining within the scope of the present disclosure as well.

In the illustrated embodiment, the laser subsystem 304 is connected to the cable connector 308 via a coupling 314. For example, the coupling 314 may be provided by optical fibers and/or other coupling materials that are configured to transmit a laser emitted by the laser subsystem 304 to the cable connector 308 (e.g., to the optical data signal transmission element 308g on the cable connector 308.) While not illustrated or discussed below, one of skill in the art in possession of the present disclosure will recognize that the optical data signal receiving element 308h on the cable connector 308 may be coupled to a controller (not illustrated) in the optical transceiver device 300 to transmit received optical signals to the controller/optical transceiver device 300 as well.

A laser shield system is included in optical transceiver chassis 302 and, in the illustrated embodiment, is provided by a first gravity-actuated laser shield element 316a that is moveably coupled to the optical transceiver chassis wall 312a, and a second gravity-actuated laser shield element 316b that is moveably coupled to the optical transceiver chassis wall 312b. In an embodiment, the first gravity-actuated laser shield element 316a and the second gravity-actuated laser shield element 316b may include a material or chemical coating that is configured to absorb or dissipate a laser emitted by the laser subsystem 304. For example, the first gravity-actuated laser shield element 316a is illustrated as pivotally connected to the optical transceiver chassis wall 312a and free to pivot about its pivotal connection to the optical transceiver chassis wall 312a such that the force of gravity acting on the first gravity-actuated laser shield element 316a(when the optical transceiver device 300 is provided in the orientation illustrated in FIG. 3A) causes the first gravity-actuated laser shield element 316a to move into the blocking orientation illustrated in FIG. 3A. As illustrated in FIG. 3B, in the blocking orientation, the first gravity-actuated laser shield element 316a extends from the optical transceiver chassis wall 312a and in front of a portion of the cable connector 308 such that the optical data signal transmission element 308g and the optical data signal receiving element 308h on the front surface 308e of the cable connector 308 are obscured from the point of view illustrated in FIG. 3B, which as discussed below allows the first gravity-actuated laser shield element 316a to block a laser emitted by the laser subsystem 304 and transmitted via the optical data signal transmission element 308g.

Similarly, the second gravity-actuated laser shield element 316b is illustrated as pivotally connected to the optical transceiver chassis wall 312b and free to pivot about its pivotal connection to the optical transceiver chassis wall 312b such that the force of gravity acting on the second gravity-actuated laser shield element 316b(when the optical transceiver device 300 is provided in the orientation illustrated in FIG. 3A) causes the second gravity-actuated laser shield element 316b to move into the non-blocking orientation illustrated in FIG. 3A. As illustrated in FIG. 3B, in the non-blocking orientation, the second gravity-actuated laser shield element 316a or oriented substantially parallel to, and in engagement with, the optical transceiver chassis wall 312b. As discussed below, when the orientation of the optical transceiver device 300 is reversed (which may occur depending on the orientation of the port to which the optical transceiver device 300 is being coupled), the force of gravity acting on the second gravity-actuated laser shield element 316b may cause the second gravity-actuated laser shield element 316b to pivot about its pivotal connection to the optical transceiver chassis wall 312b and move into a blocking orientation similar to the blocking orientation of the first gravity-actuated laser shield element 316b illustrated in FIGS. 3A and 3B (while causing the first gravity-actuated laser shield element 316a to move into a non-blocking orientation similar to the non-blocking orientation of the second gravity-actuated laser shield element 316a illustrated in FIGS. 3A and 3B.) However, while a specific optical transceiver device 300 has been illustrated and described, one of skill in the art in possession of the present disclosure will recognize that the optical transceiver device of the present disclosure may include a variety of components and component configurations while remaining within the scope of the present disclosure as well.

Figure 4A:
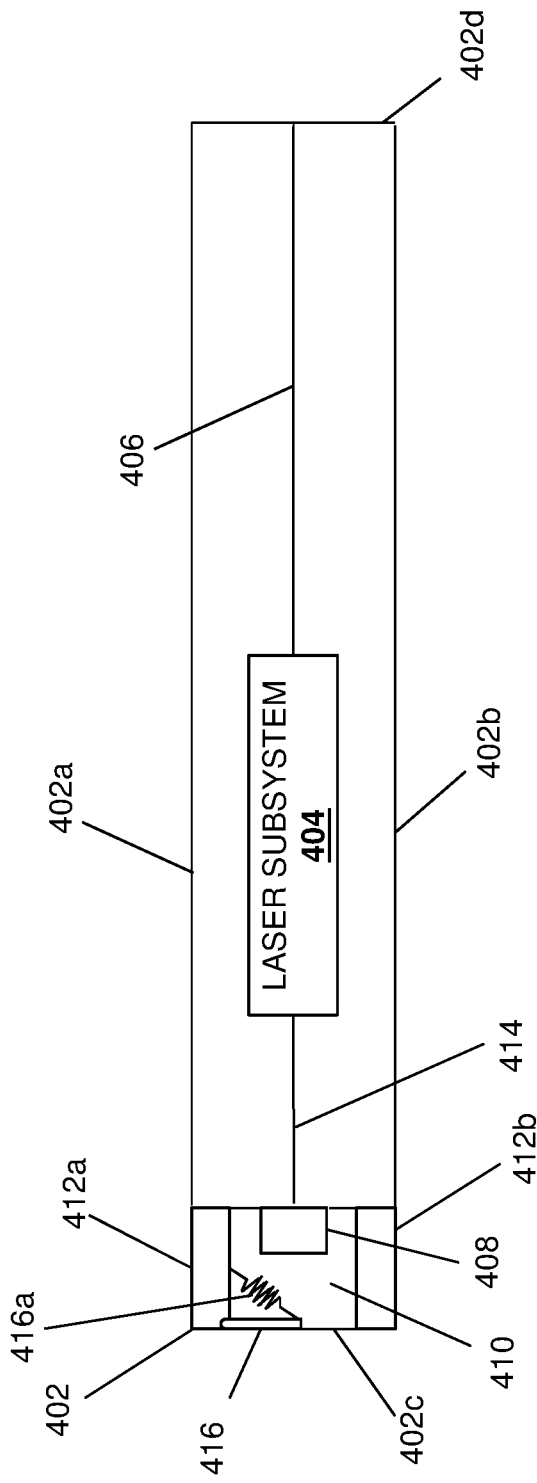
FIG. 4A is a schematic view illustrating an embodiment of the optical transceiver device of FIG. 2.
Figure 4B:
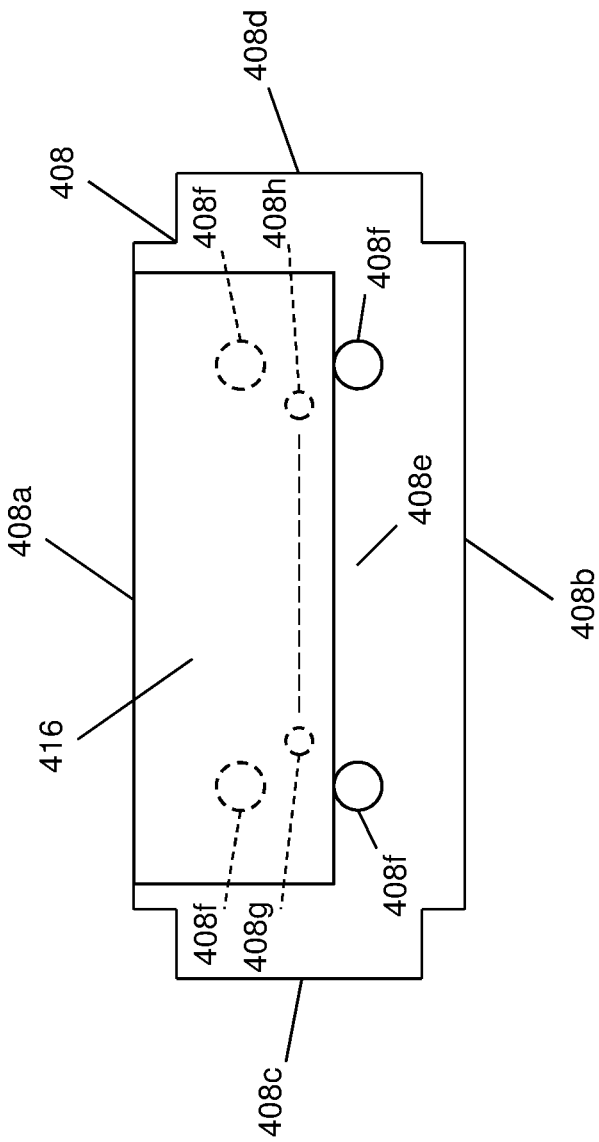
FIG. 4B is a schematic view illustrating an embodiment of an optical connector on optical transceiver device of FIG. 4A

Referring now to FIGS. 4A and 4B, an embodiment of an optical transceiver device 400 is illustrated that may provide the optical transceiver device 200 discussed above with reference to FIG. 2, and one of skill in the art in possession of the present disclosure will recognize that the embodiment of the optical transceiver device 400 illustrated in FIG. 4A includes an optical transceiver chassis that is similar to the optical transceiver chassis 202 discussed above with reference to FIG. 2, while omitting a computing device connector (similar to the computing device connector 204 discussed above with reference to FIG. 2) for clarity of illustration and discussion. As such, the optical transceiver device 400 may include an optical transceiver chassis 402 having a top surface 402a, a bottom surface 402b that is located opposite the optical transceiver chassis 402 from the top surface 402a, a front surface 402c that extends between the top surface 402a and the bottom surface 402b, a rear surface 402d that is located opposite the optical transceiver chassis 402 from the front surface 402c and that extends between the top surface 402a and the bottom surface 402b, and a pair of opposing side surfaces (not illustrated in FIG. 4A) that are located opposite the optical transceiver chassis 402 from each other and that extend between the top surface 402a, the bottom surface 402b, the front surface 402c, and the rear surface 402d. Thus, one of skill in the art in possession of the present disclosure will appreciate that the optical transceiver chassis 402 and its top surface 402a, bottom surface 402b, front surface 402c, and rear surface 402d(as well as its unillustrated side surfaces) may correspond to the optical transceiver chassis 200 and its respective top surface 202a, bottom surface 202b, front surface 202c, and rear surface 202d(as well as its side surface 202e and unillustrated side surface.)

In the illustrated embodiment, the optical transceiver chassis 402 houses a laser subsystem 404 that may include any laser subsystem components that are configured to emit a laser as discussed below, as well as any laser subsystem controller components known in the art. As such, while not illustrated in FIG. 4A, one of skill in the art in possession of the present disclosure will recognize that the optical transceiver chassis 402 may house a variety of other laser subsystem components and controller components for providing the laser subsystem functionality discussed below while remaining within the scope of the present disclosure as well. As illustrated, the laser subsystem 404 may be coupled via a coupling 406 to a computing device connector (e.g., similar to the computing device connector 204 discussed above with reference to FIG. 2) that extends from the rear surface 402d of the optical transceiver device 400.

In the illustrated embodiment, the optical transceiver chassis 402 also includes a cable connector 408 (e.g., an optical connector that is configured to connect to a fiber optic connector on a fiber optic cable, as discussed above) that is located in a cable connector housing 410 that is defined between the front surface 402c of the optical transceiver chassis 402, an optical transceiver chassis wall 412a that provides a portion of the top surface 402a of the optical transceiver chassis 402, and an optical transceiver chassis wall 412b that provides a portion of the bottom surface 402b of the optical transceiver chassis 402. FIG. 4B illustrates an embodiment of the cable connector 408 that includes a top edge 408a, a bottom edge 408b that is located opposite the cable connector 408 from the top edge 408a, a pair of side edges 408c and 408d that are located opposite the cable connector 408 from each other and that extend between the top edge 408a and the bottom edge 408b, and a front surface 408e that extends between the top edge 408a, the bottom edge 408b, and the side edges 408c and 408d. The cable connector 408 illustrated in FIG. 4B includes a plurality of alignment elements 408f that are included on the front surface 408e of the cable connector 408, an optical data signal transmission element 408g that is included on the front surface 408e of the cable connector 408, and an optical data signal receiving element 408h that is included on the front surface 408e of the cable connector 408. As will be appreciated by one of skill in the art in possession of the present disclosure, the alignment elements 408f may be configured to engage a transceiver connector on a cable in order to align fiber optical cabling in the cable and accessible on the transceiver connector with the optical data signal transmission element 408g and the optical data signal receiving element 408h. Furthermore, while not explicitly illustrated in FIGS. 4A and 4B, one of skill in the art in possession of the present disclosure will appreciate that the cable connector 408 may include a variety of other features (e.g., transceiver connector securing features, etc.) while remaining within the scope of the present disclosure as well.

In the illustrated embodiment, the laser subsystem 404 is connected to the cable connector 408 via a coupling 414. For example, the coupling 414 may be provided by optical fibers and/or other coupling materials that are configured to transmit a laser emitted by the laser subsystem 404 to the cable connector 408 (e.g., to the optical data signal transmission element 408g on the cable connector 408.) While not illustrated or discussed below, one of skill in the art in possession of the present disclosure will recognize that the optical data signal receiving element 408h on the cable connector 408 may be coupled to a controller (not illustrated) in the optical transceiver device 400 to provide received optical signals to the controller/optical transceiver device 400 as well.

A laser shield system is included in optical transceiver chassis 402 and, in the illustrated embodiment, is provided by a resiliently-biased laser shield element 416 that is moveably coupled to the optical transceiver chassis wall 412a, and a resilient member 416a that extends between the optical transceiver chassis wall 412a and the resiliently-biased laser shield element 416. In an embodiment, the resiliently-biased laser shield element 416 may include a material or chemical coating that is configured to absorb or dissipate a laser emitted by the laser subsystem 404. For example, the resiliently-biased laser shield element 416 is illustrated as pivotally connected to the optical transceiver chassis wall 412a, with the resilient member 416a providing a force on the resiliently-biased laser shield element 416 to bias the resiliently-biased laser shield element 416 about its pivotal connection to the optical transceiver chassis wall 412a and into the blocking orientation illustrated in FIG. 4A. As illustrated in FIG. 4B, in the blocking orientation, the resiliently-biased laser shield element 416 extends from the optical transceiver chassis wall 412a and in front of a portion of the cable connector 408 such that the optical data signal transmission element 408g and the optical data signal receiving element 408h on the front surface 408e of the cable connector 408 are obscured from the point of view illustrated in FIG. 4B, which as discussed below allows the resiliently-biased laser shield element 416 to block a laser emitted by the laser subsystem 404 and transmitted via the optical data signal transmission element 408g. While the resiliently-biased laser shield element 416 is illustrated coupled to the optical transceiver chassis wall 412a with the resilient member 416a extending between the optical transceiver chassis wall 412a and the resiliently-biased laser shield element 416, the resiliently-biased laser shield element 416 may be coupled to the optical transceiver chassis wall 412b with the resilient member 416a extending between the optical transceiver chassis wall 412b and the resiliently-biased laser shield element 416 while remaining within the scope of the present disclosure as well.

Figure 5A:
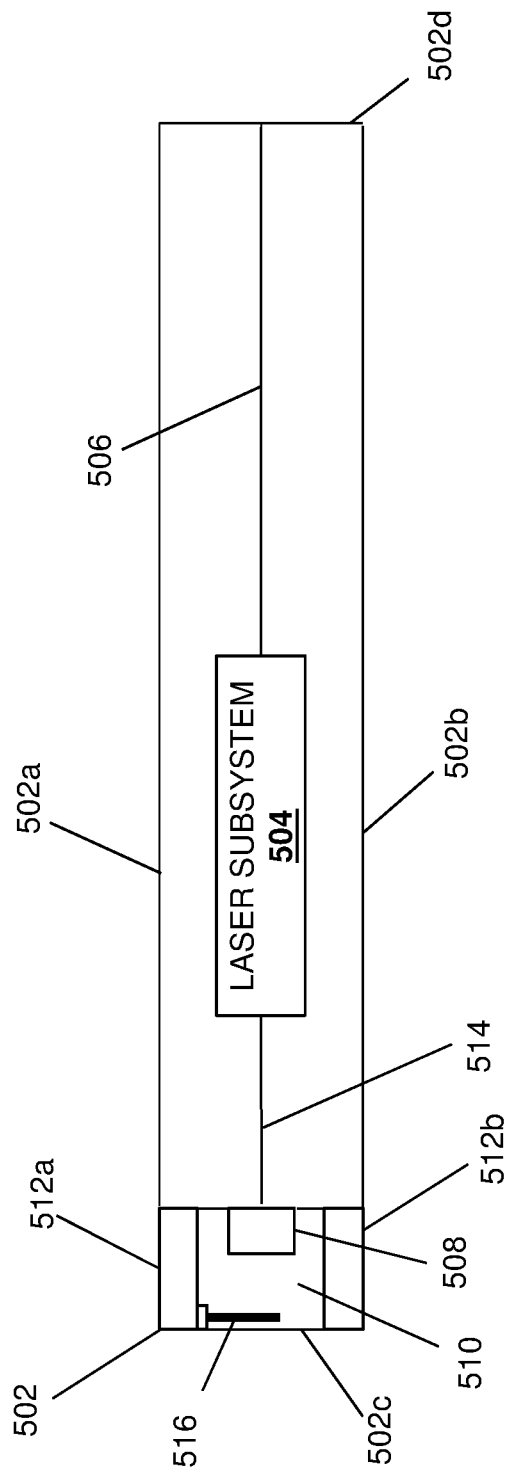
FIG. 5A is a schematic view illustrating an embodiment of the optical transceiver device of FIG. 2.
Figure 5B:
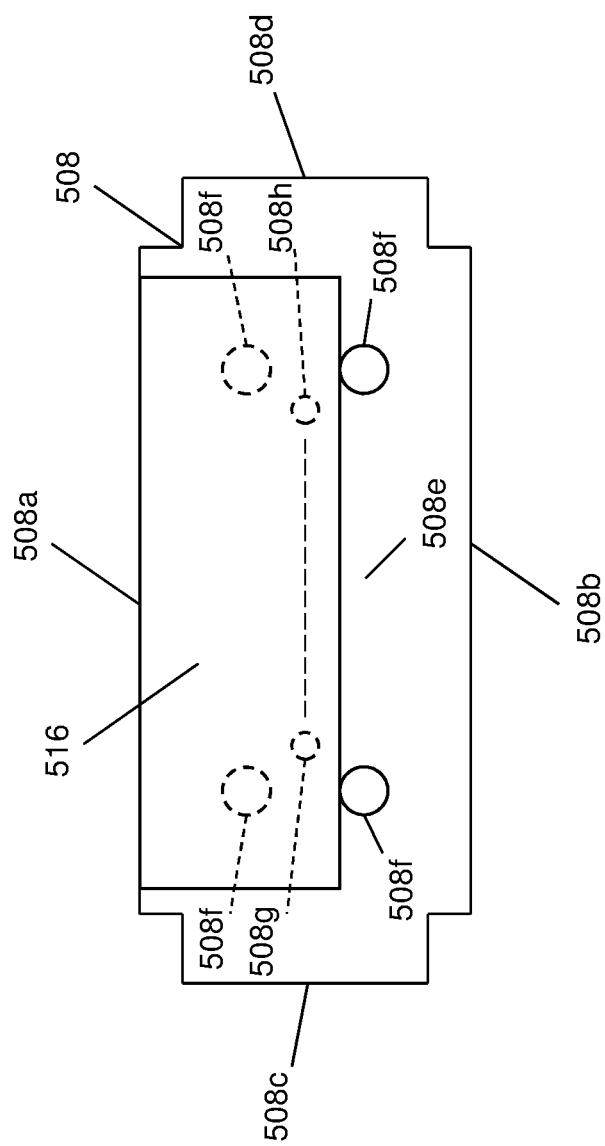
FIG. 5B is a schematic view illustrating an embodiment of an optical connector on optical transceiver device of FIG. 4A

Referring now to FIGS. 5A and 5B, an embodiment of an optical transceiver device 500 is illustrated that may provide the optical transceiver device 200 discussed above with reference to FIG. 2, and one of skill in the art in possession of the present disclosure will recognize that the embodiment of the optical transceiver device 500 illustrated in FIG. 5A includes an optical transceiver chassis that is similar to the optical transceiver chassis 202 discussed above with reference to FIG. 2, while omitting a computing device connector (similar to the computing device connector 204 discussed above with reference to FIG. 2) for clarity of illustration and discussion. As such, the optical transceiver device 500 may include an optical transceiver chassis 502 having a top surface 502a, a bottom surface 502b that is located opposite the optical transceiver chassis 502 from the top surface 502a, a front surface 502c that extends between the top surface 502a and the bottom surface 502b, a rear surface 502d that is located opposite the optical transceiver chassis 502 from the front surface 502c and that extends between the top surface 502a and the bottom surface 502b, and a pair of opposing side surfaces (not illustrated in FIG. 5A) that are located opposite the optical transceiver chassis 502 from each other and that extend between the top surface 502a, the bottom surface 502b, the front surface 502c, and the rear surface 502d. Thus, one of skill in the art in possession of the present disclosure will appreciate that the optical transceiver chassis 502 and its top surface 502a, bottom surface 502b, front surface 502c, and rear surface 502d(as well as its unillustrated side surfaces) may correspond to the optical transceiver chassis 200 and its respective top surface 202a, bottom surface 202b, front surface 202c, and rear surface 202d(as well as its side surface 202e and unillustrated side surface.)

In the illustrated embodiment, the optical transceiver chassis 502 houses a laser subsystem 504 that may include any laser subsystem components that are configured to emit a laser as discussed below, as well as any laser subsystem controller components known in the art. As such, while not illustrated in FIG. 5A, one of skill in the art in possession of the present disclosure will recognize that the optical transceiver chassis 502 may house a variety of other laser subsystem components and controller components for providing the laser subsystem functionality discussed below while remaining within the scope of the present disclosure as well. As illustrated, the laser subsystem 504 may be coupled via a coupling 506 to a computing device connector (e.g., similar to the computing device connector 204 discussed above with reference to FIG. 2) that extends from the rear surface 502d of the optical transceiver device 500.

In the illustrated embodiment, the optical transceiver chassis 502 also includes a cable connector 508 (e.g., an optical connector that is configured to connect to a fiber optic connector on a fiber optic cable, as discussed above) that is located in a cable connector housing 510 that is defined between the front surface 502c of the optical transceiver chassis 502, an optical transceiver chassis wall 512a that provides a portion of the top surface 502a of the optical transceiver chassis 502, and an optical transceiver chassis wall 512b that provides a portion of the bottom surface 502b of the optical transceiver chassis 502. FIG. 5B illustrates an embodiment of the cable connector 508 that includes a top edge 508a, a bottom edge 508b that is located opposite the cable connector 508 from the top edge 508a, a pair of side edges 508c and 508d that are located opposite the cable connector 508 from each other and that extend between the top edge 508a and the bottom edge 508b, and a front surface 508e that extends between the top edge 508a, the bottom edge 508b, and the side edges 508c and 508d. The cable connector 508 illustrated in FIG. 5B includes a plurality of alignment elements 508f that are included on the front surface 508e of the cable connector 508, an optical data signal transmission element 508g that is included on the front surface 508e of the cable connector 508, and an optical data signal receiving element 508h that is included on the front surface 508e of the cable connector 508. As will be appreciated by one of skill in the art in possession of the present disclosure, the alignment elements 508f may be configured to engage a transceiver connector on a cable in order to align fiber optical cabling in the cable and accessible on the transceiver connector with the optical data signal transmission element 508g and the optical data signal receiving element 508h. Furthermore, while not explicitly illustrated in FIGS. 5A and 5B, one of skill in the art in possession of the present disclosure will appreciate that the cable connector 508 may include a variety of other features (e.g., transceiver connector securing features, etc.) while remaining within the scope of the present disclosure as well.

In the illustrated embodiment, the laser subsystem 504 is connected to the cable connector 508 via a coupling 514. For example, the coupling 514 may be provided by optical fibers and/or other coupling materials that are configured to transmit a laser emitted by the laser subsystem 504 to the cable connector 508 (e.g., to the optical data signal transmission element 508g on the cable connector 508.) While not illustrated or discussed below, one of skill in the art in possession of the present disclosure will recognize that the optical data signal receiving element 508h on the cable connector 508 may be coupled to a controller (not illustrated) in the optical transceiver device 500 to provide received optical signals to the controller/optical transceiver device 500 as well.

A laser shield system is included in optical transceiver chassis 502 and, in the illustrated embodiment, is provided by a deformable laser shield element 516 that extends from the optical transceiver chassis wall 512a. In an embodiment, the deformable laser shield element 516 may include a material or chemical coating that is configured to absorb or dissipate a laser emitted by the laser subsystem 504. For example, the deformable laser shield element 516 is illustrated as extending from the optical transceiver chassis wall 512a into the blocking orientation illustrated in FIG. 5A. As illustrated in FIG. 5B, in the blocking orientation, the deformable laser shield element 516 extends from the optical transceiver chassis wall 512a and in front of a portion of the cable connector 508 such that the optical data signal transmission element 508g and the optical data signal receiving element 508h on the front surface 508e of the cable connector 508 are obscured from the point of view illustrated in FIG. 5B, which as discussed below allows the deformable laser shield element 516 to block a laser emitted by the laser subsystem 504 and transmitted via the optical data signal transmission element 508g. While the deformable laser shield element 516 is illustrated coupled to the optical transceiver chassis wall 512a, the deformable laser shield element 516 may be coupled to the optical transceiver chassis wall 512b while remaining within the scope of the present disclosure as well.

While three specific examples of laser shield system are illustrated and described herein that operate to block a laser emitted by a laser subsystem in an optical transceiver device when a cable is not connected to that optical transceiver device, one of skill in the art in possession of the present disclosure will appreciate that other laser shield systems may be provided according to the teachings of the present disclosure to mechanically block the laser emitted by a laser subsystem from an optical transceiver device when a cable is not connected to that optical transceiver device while remaining within its scope as well.

Figure 6:
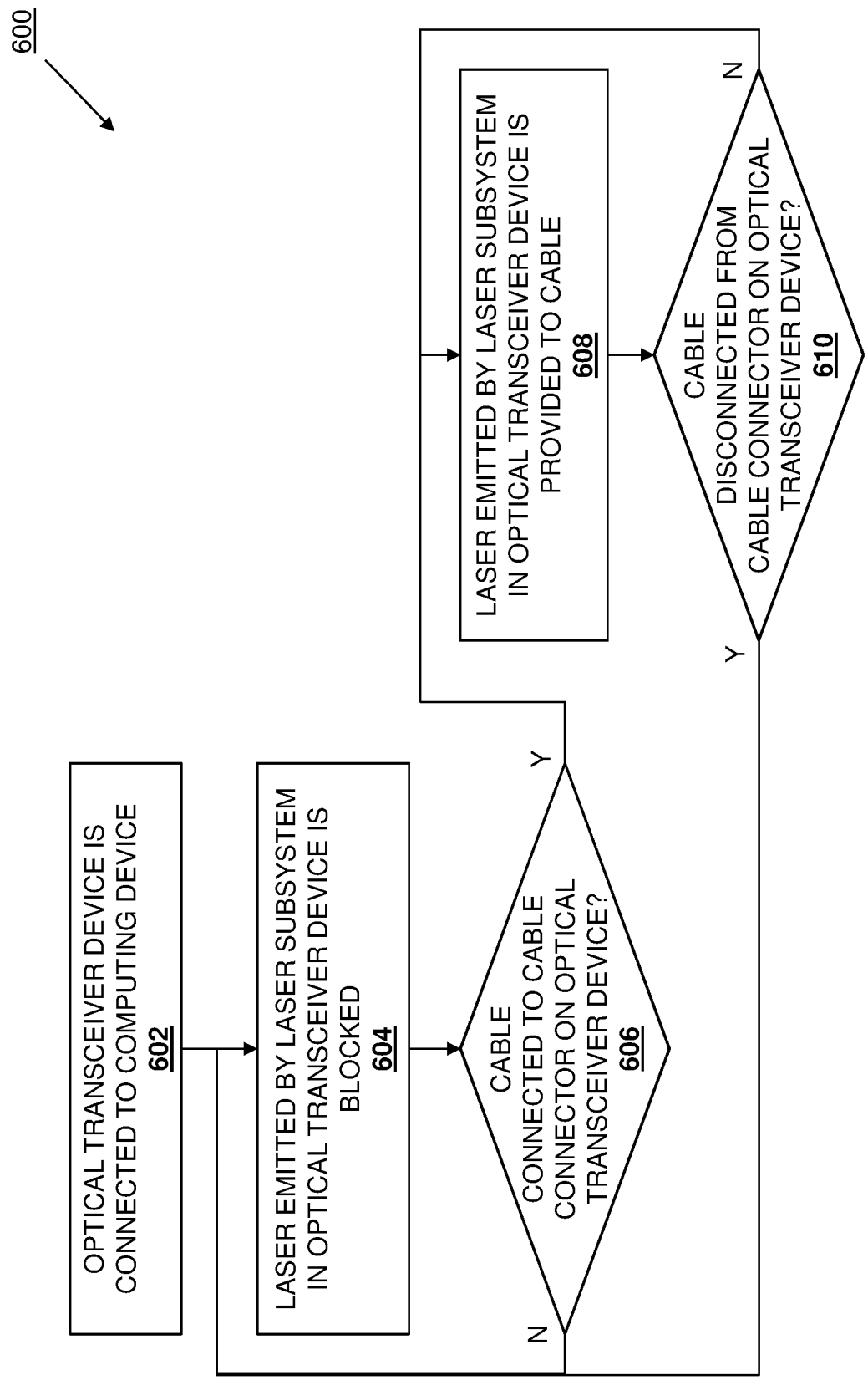
FIG. 6 is a flow chart illustrating an embodiment of a method for operating an optical transceiver device.

Referring now to FIG. 6, an embodiment of a method 600 for operating an optical transceiver device is illustrated. As discussed below, the systems and methods of the present disclosure provide a laser shield system in an optical transceiver device that blocks a laser emitted by a laser subsystem in the optical transceiver device when no cable is connected to the optical transceiver device, while being movable in response to engagement with a transceiver connector on a cable to allow the connection of the cable to the optical transceiver device. For example, the laser shield subsystem may include a gravity-actuated laser shield element that is moved into a blocking orientation in response to gravitational forces to block a laser emitted by a laser subsystem in the optical transceiver device, while moving in response to engagement with a transceiver connector on a cable to allow the cable to be connected to the optical transceiver device. In another example, the laser shield subsystem may include a resiliently-biased laser shield element that is biased into a blocking orientation by a resilient member to block a laser emitted by a laser subsystem in the optical transceiver device, while moving in response to engagement with a transceiver connector on a cable to allow the cable to be connected to the optical transceiver device. In another example, the laser shield subsystem may include a deformable laser shield element that is provided in a blocking orientation to block a laser emitted by a laser subsystem in the optical transceiver device, while deforming in response to engagement with a transceiver connector on a cable to allow the cable to be connected to the optical transceiver device. As such, the laser emitted by the laser subsystem in the optical transceiver device is blocked when no cable is connected the cable connector on the optical transceiver device, thus eliminating the possibility of a laser produced by the laser subsystem escaping the optical transceiver device and presenting a danger to the eyes of users.

Figure 7A:
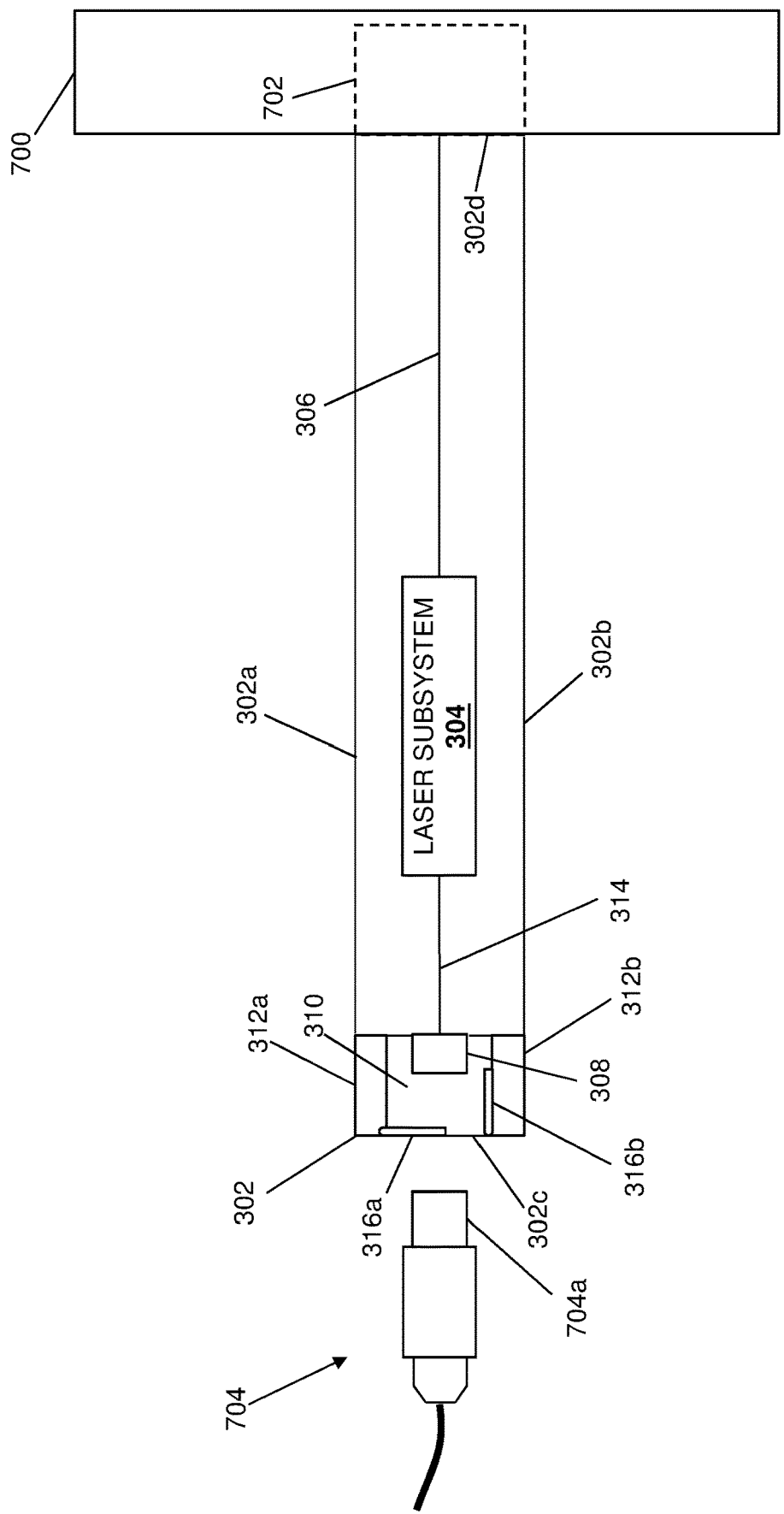
FIG. 7A is a schematic view illustrating an embodiment of the optical transceiver device of FIGS. 3A and 3B operating during the method of FIG. 5.

The method 600 begins at block 602 where an optical transceiver device is connected to a computing device. With reference to FIG. 7A, a computing device 700 such as, for example, a switch device or other networking device known in the art, may be provided that includes an optical transceiver device port 702. As such, in an embodiment of block 602, the optical transceiver device 300 may be positioned adjacent the port 702 on the computing device 700 such that the rear surface 302d(and a computing device connector similar to the computing device connector 204 on the optical transceiver device 200) is located adjacent the optical transceiver device port 702. The optical transceiver device 300 may then be moved towards the optical transceiver device port 702 such that the computing device connector on the optical transceiver device 300 engages the optical transceiver device port 702 to connect and secure the optical transceiver device 300 in the optical transceiver device port 702 on the computing device 700, as illustrated in FIG. 7A.

Figure 8A:
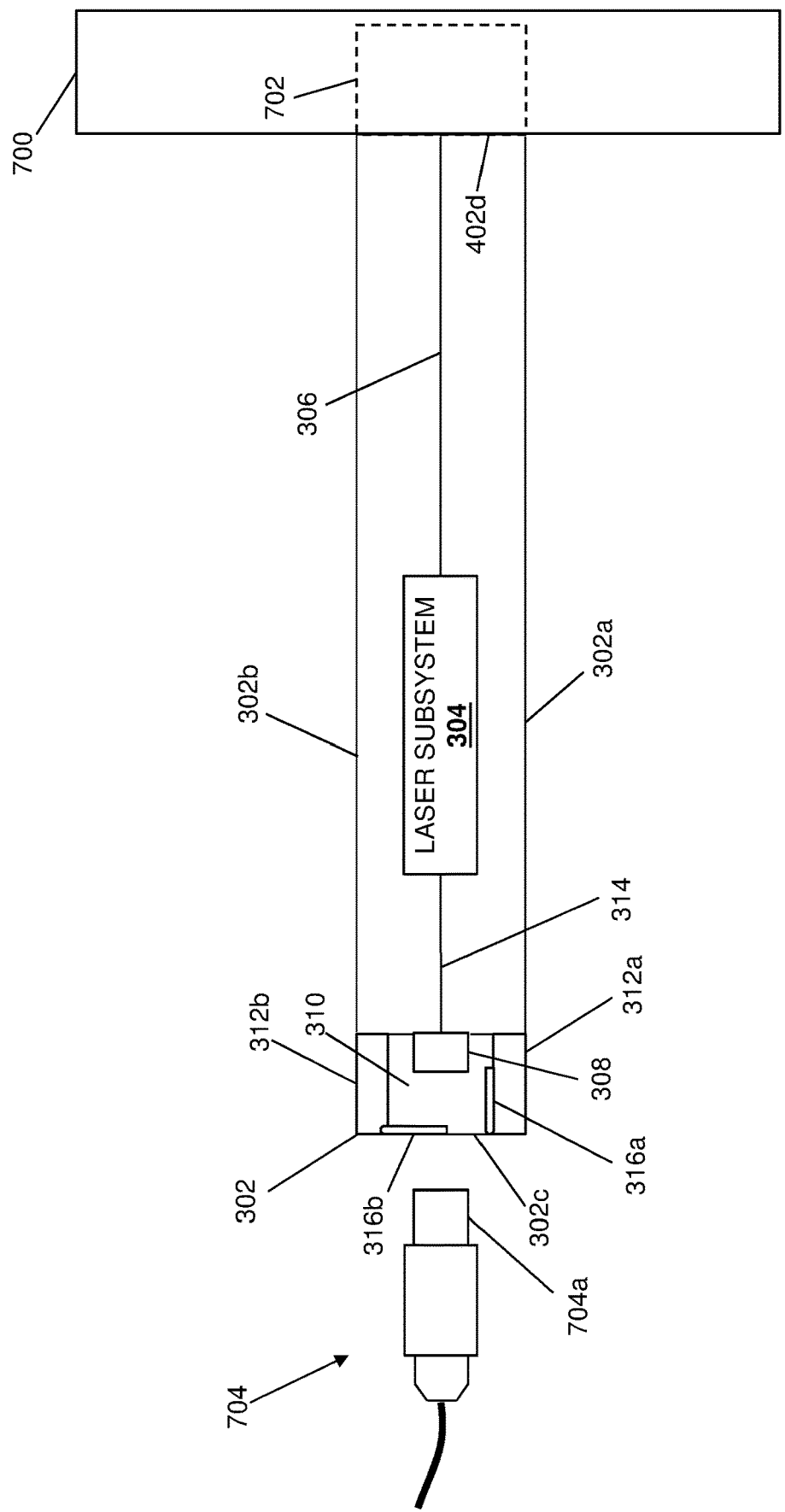
FIG. 8A is a schematic view illustrating an embodiment of the optical transceiver device of FIGS. 3A and 3B operating during the method of FIG. 5.
Figure 9A:
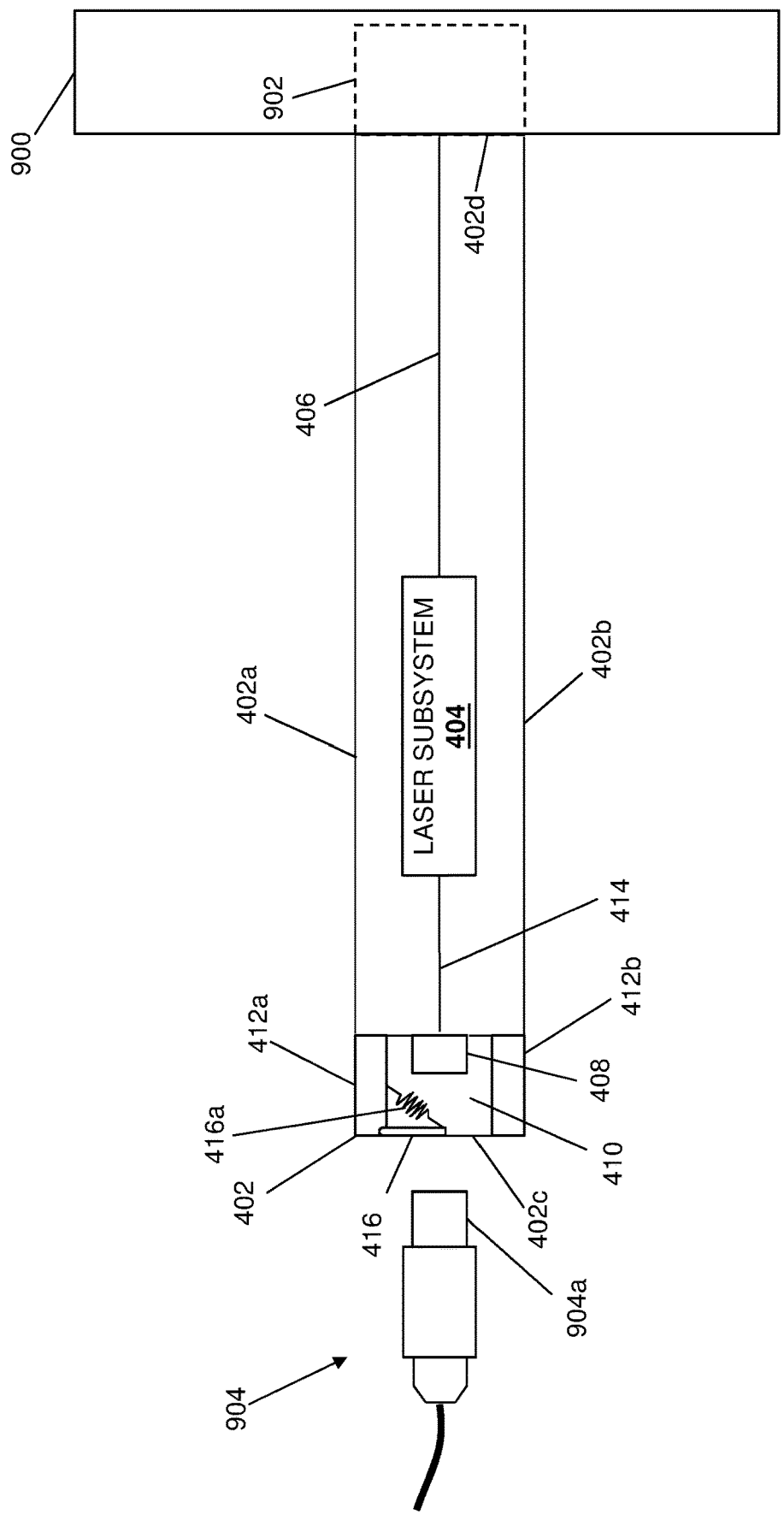
FIG. 9A is a schematic view illustrating an embodiment of the optical transceiver device of FIGS. 4A and 4B operating during the method of FIG. 5.

Similarly, with reference to FIG. 9A, a computing device 900 such as, for example, a switch device or other networking device known in the art, may be provided that includes an optical transceiver device port 902. As such, in an embodiment of block 602, the optical transceiver device 400 may be positioned adjacent the port 902 on the computing device 900 such that the rear surface 402d(and a computing device connector similar to the computing device connector 204 on the optical transceiver device 200) is located adjacent the optical transceiver device port 902. The optical transceiver device 400 may then be moved towards the optical transceiver device port 902 such that the computing device connector on the optical transceiver device 400 engages the optical transceiver device port 902 to connect and secure the optical transceiver device 400 in the optical transceiver device port 902 on the computing device 900, as illustrated in FIG. 8A.

Figure 10A:
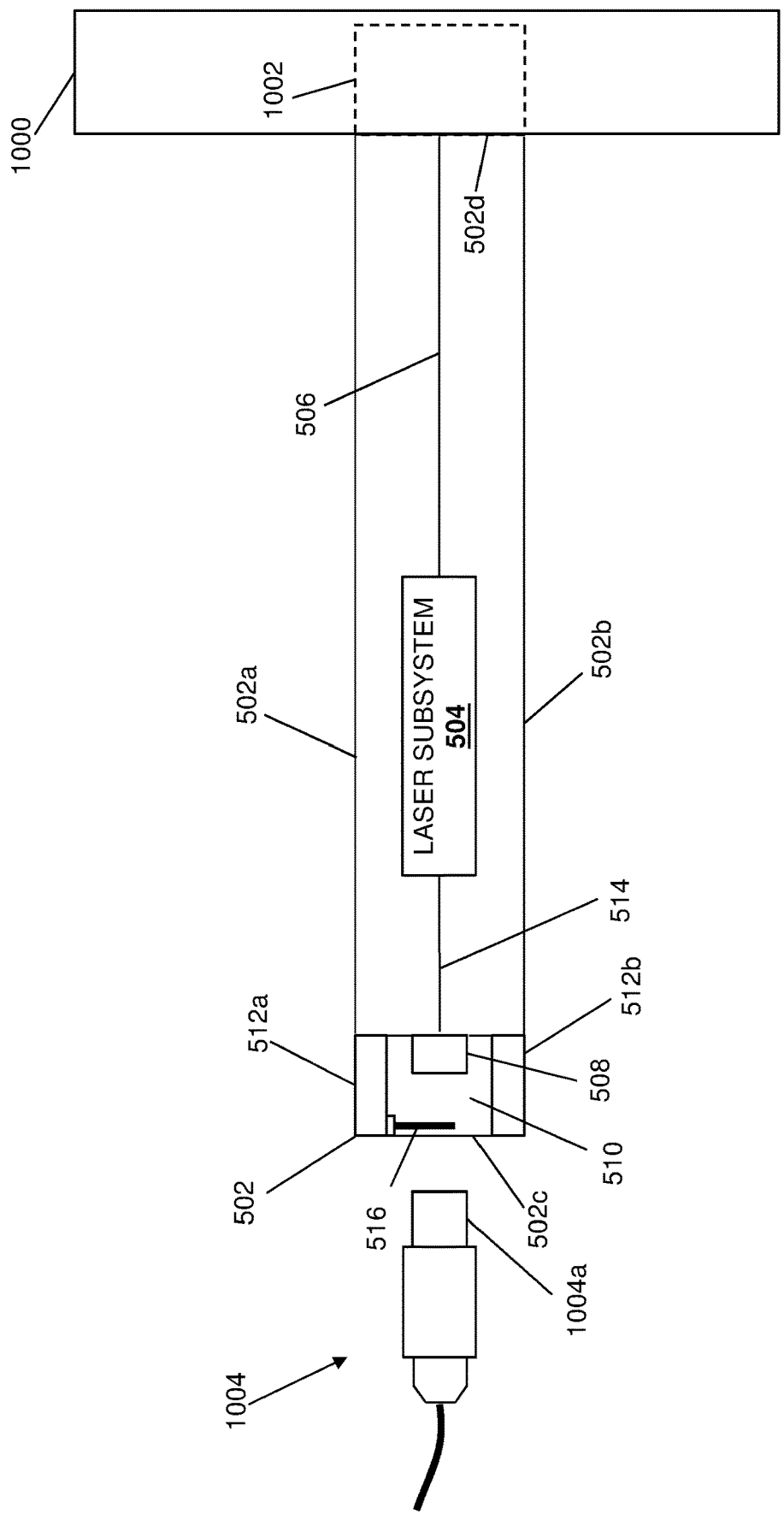
FIG. 10A is a schematic view illustrating an embodiment of the optical transceiver device of FIGS. A and 3B5 operating during the method of FIG. 5.

Similarly, with reference to FIG. 10A, a computing device 1000 such as, for example, a switch device or other networking device known in the art, may be provided that includes an optical transceiver device port 1002. As such, in an embodiment of block 602, the optical transceiver device 500 may be positioned adjacent the port 1002 on the computing device 1000 such that the rear surface 502d(and a computing device connector similar to the computing device connector 204 on the optical transceiver device 200) is located adjacent the optical transceiver device port 1002. The optical transceiver device 500 may then be moved towards the optical transceiver device port 1002 such that the computing device connector on the optical transceiver device 500 engages the optical transceiver device port 1002 to connect and secure the optical transceiver device 500 in the optical transceiver device port 1002 on the computing device 1000, as illustrated in FIG. 10A.

The method 600 then proceeds to block 604 where a laser emitted by a laser subsystem in the optical transceiver device is blocked. In an embodiment, at block 604, the laser subsystem 304/404/504 in the optical transceiver device 300/400/500 may be blocked by the laser shield system in that optical transceiver device 300/400/500. As would be understood by one of skill in the art in possession of the present disclosure, the optical transceiver devices 300/400/500 may be configured to activate their laser subsystems 304/404/504 (e.g., by default) in response to the connecting of those optical transceiver devices 300/400/500 to the ports 702/902/1002 on the computing devices 700/900/1000. As such, connection of the optical transceiver devices 300/400/500 to the ports 702/902/1002 on the computing devices 700/900/1000 as described above will result in the activation of the laser subsystems 304/404/504 that will cause a laser to be emitted from those laser subsystems 304/404/504. Furthermore, as discussed above for conventional optical transceiver devices, the emission of a laser by the laser subsystem and the transmission of that laser out of the optical data signal transmission element on the cable connector on the conventional optical transceiver device will cause that laser to be emitted into the area adjacent the conventional optical transceiver device and, in situations where no cable in connected to that cable connector, presents a danger to the eyes of users that may enter that area. As such, at block 604, the laser shield systems in the optical transceiver devices 300/400/500 may operate to block the laser emitted by the laser subsystems 304/404/504 when no cable is connected to the optical transceiver devices 300/400/500.

The method 600 then proceeds to decision block 606 where the method 600 proceeds depending on whether a cable is connected to a cable connector on the optical transceiver device. If, at decision block 606, a cable is not connected to the cable connector on the optical transceiver device, the method 600 returns to block 604. As such, the method 600 may loop such that the laser shield systems in the optical transceiver devices 300/400/500 operate to block the laser emitted by the laser subsystems 304/404/504 when no cable is connected to the optical transceiver devices 300/400/500, thus eliminating the emission of the laser that would otherwise be emitted from conventional optical transceiver devices and into the area adjacent those conventional optical transceiver devices when they are connected to the ports 702/902/1002 and no cable is connected to those conventional optical transceiver devices, as discussed above.

Figure 7B:
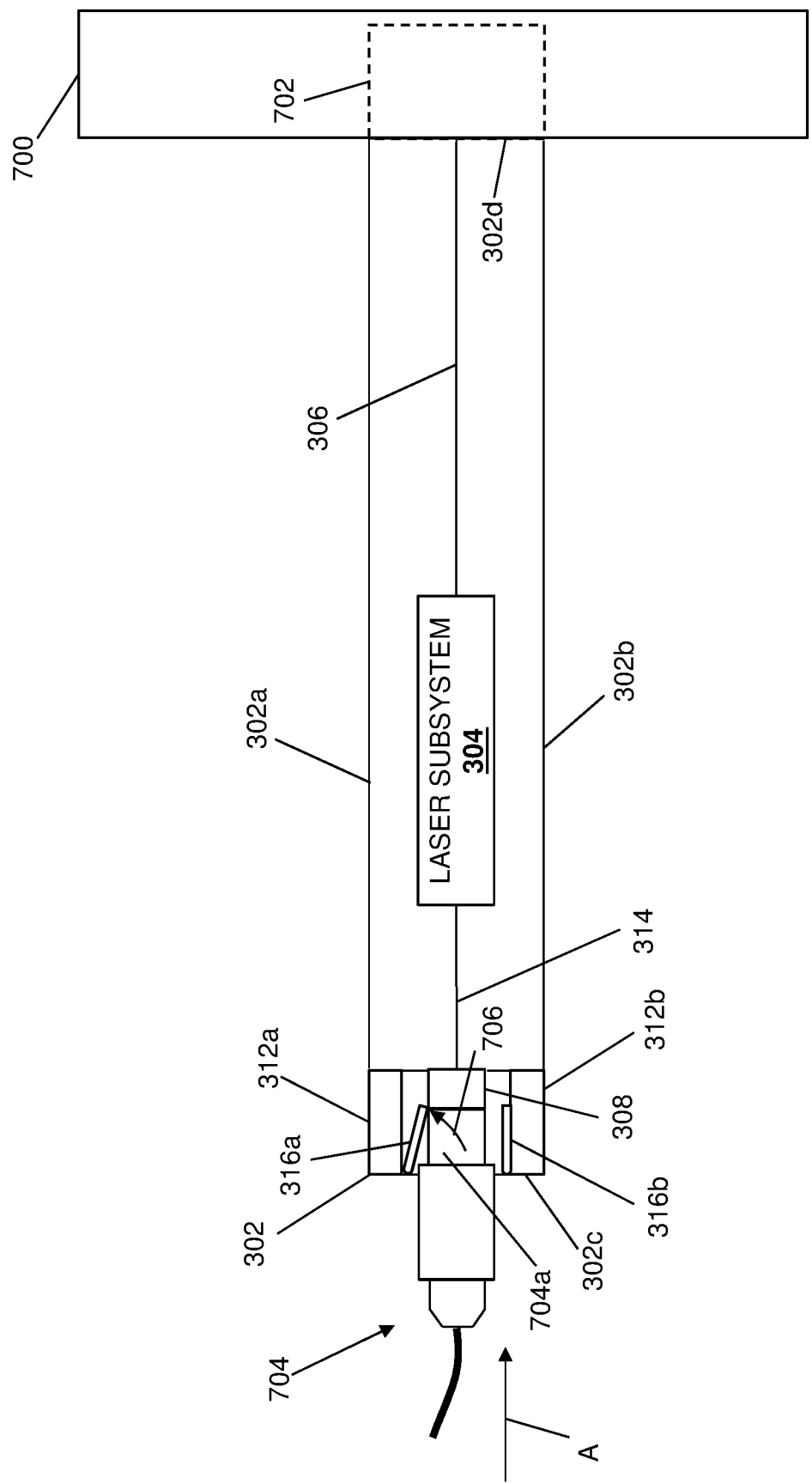
FIG. 7B is a schematic view illustrating an embodiment of the optical transceiver device of FIGS. 3A and 3B operating during the method of FIG. 5.

If at decision block 606, a cable is connected to the cable connector on the optical transceiver device, the method 600 proceeds to block 608 where the laser emitted by the laser subsystem in the optical transceiver device is provided to the cable. In an embodiment, at block 608 and in response to a cable being connected to the cable connector 308/408/508 on the optical transceiver device 300/400/500, the laser emitted by the laser subsystem 304/404/504 is provided to the cable. For example, with reference to FIGS. 7A, a cable 704 including a transceiver connector 704a may be positioned adjacent the optical transceiver device 300 such that the transceiver connector 704a is located adjacent the front surface 302c of the optical transceiver chassis 302 and aligned with the cable connector 308 on the optical transceiver device 300. As illustrated in FIG. 7B, the transceiver connector 704a may then be moved in a direction A such that the transceiver connector 704a engages the cable connector 308.

As will be appreciated by one of skill in the art in possession of the present disclosure, the engagement of the transceiver connector 704a with the cable connector 308 may begin with the engagement of the transceiver connector 704a with the first gravity-actuated laser shield element 316a as the transceiver connector 704a is moved in the direction A. Continued movement of the transceiver connector 704a in the direction A will then cause the transceiver connector 704a to move the first gravity-actuated laser shield element 316a such that the first gravity-actuated laser shield element 316a pivots about its connection to the optical transceiver chassis wall 312a(as illustrated by element 706 in FIG. 7B) in order to allow the transceiver connector 704a to move through the cable connector housing 310 and secure to the cable connector 308 on the optical transceiver device 300. As will be appreciated by one of skill in the art in possession of the present disclosure, the securing of the transceiver connector 704a to the cable connector 308 allows the laser emitted by the laser subsystem 304 to be provided via the optical data signal transmission element 308g on the cable connector 308 and through fiber optic cables in the transceiver connector 704a and the cable 704, thus allowing the use of the optical transceiver device 300 to transmit optical data signals via the cable 704.

Figure 8B:
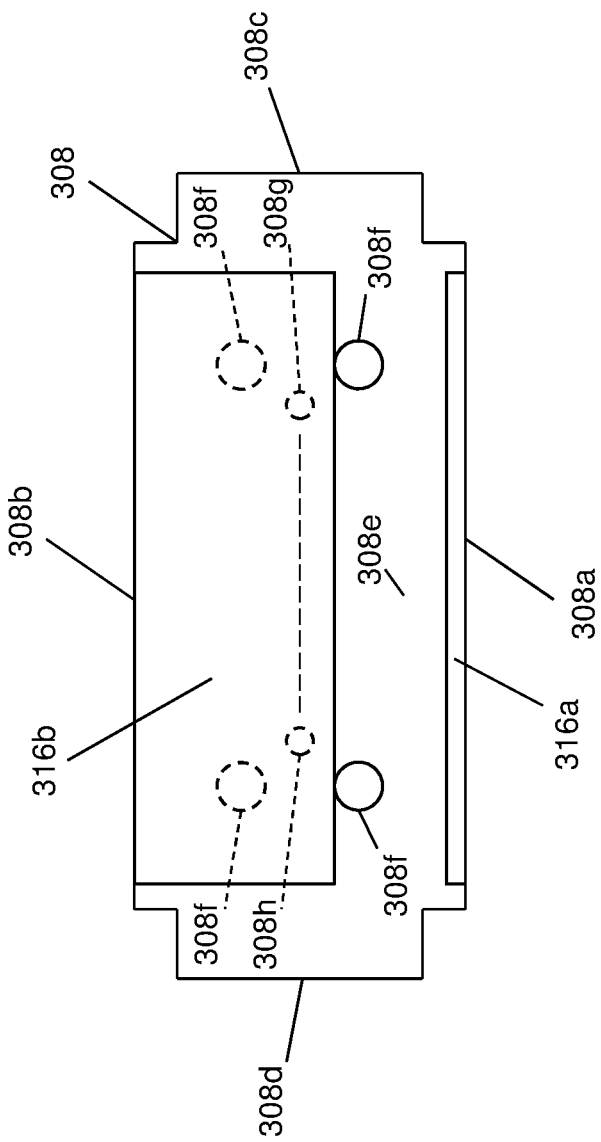
FIG. 8B is a schematic view illustrating an embodiment of the optical transceiver device of FIGS. 3A and 3B operating during the method of FIG. 5.
Figure 8C:
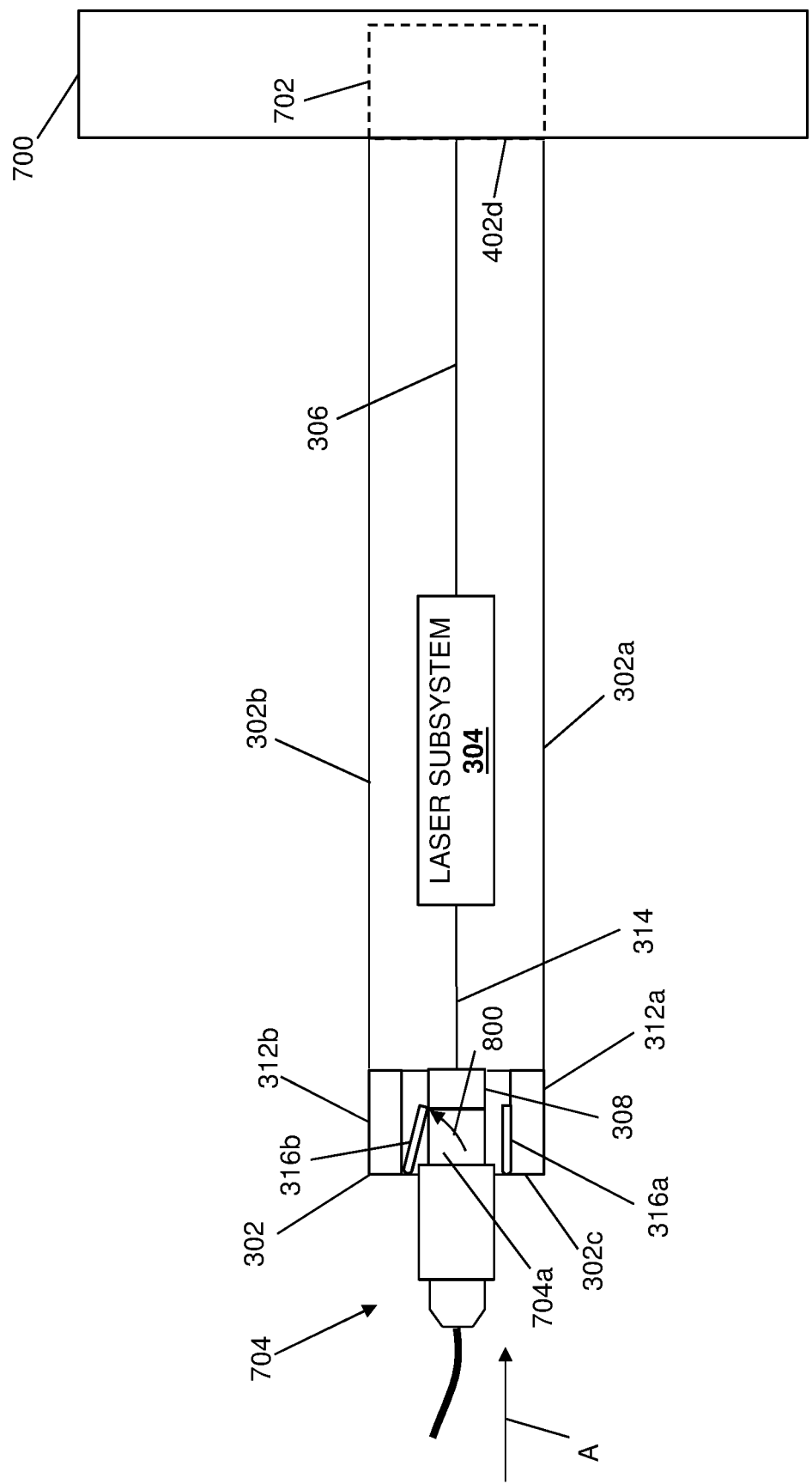
FIG. 8C is a schematic view illustrating an embodiment of the optical transceiver device of FIGS. 3A and 3B operating during the method of FIG. 5.

With reference to FIGS. 8A, 8B, and 8C, the optical transceiver device 300 is illustrated coupled to the port 702 on the computing device 700 in an orientation that is opposite that illustrated in FIGS. 7A and 7B. As illustrated in FIGS. 8A and 8B, with the optical transceiver device 300 coupled to the port 702 on the computing device 700 in the orientation illustrated in FIGS. 8A and 8B, the second gravity-actuated laser shield element 316b may pivot about its pivotal connection to the optical transceiver chassis wall 312b such that the force of gravity acting on the second gravity-actuated laser shield element 316b causes the second laser shield element 316b to move into a blocking orientation, while causing the first gravity-actuated laser shield element 316a to move into a non-blocking orientation. As illustrated in FIG. 8C and similarly as discussed above, the cable 704 including the transceiver connector 704a may then be positioned adjacent the optical transceiver device 300 such that the transceiver connector 704a is located adjacent the front surface 302c of the optical transceiver chassis 302 and aligned with the cable connector 308 on the optical transceiver device 300, and the transceiver connector 704a may then be moved in the direction A such that the transceiver connector 704a engages the cable connector 308.

As will be appreciated by one of skill in the art in possession of the present disclosure, the engagement of the transceiver connector 704a with the cable connector 308 may begin with the engagement of the transceiver connector 704a with the second gravity-actuated laser shield element 316b as the transceiver connector 704a is moved in the direction A. Continued movement of the transceiver connector 704a in the direction A will then cause the transceiver connector 704a to move the second gravity-actuated laser shield element 316b such that the second gravity-actuated laser shield element 316b pivots about its connection to the optical transceiver chassis wall 312b(as illustrated by element 800 in FIG. 8C) in order to allow the transceiver connector 704a to move through the cable connector housing 310 and secure to the cable connector 308 on the optical transceiver device 300. As will be appreciated by one of skill in the art in possession of the present disclosure, the securing of the transceiver connector 704a to the cable connector 308 allows the laser emitted by the laser subsystem 304 to be provided via the optical data signal transmission element 308g on the cable connector 308 and through fiber optic cables in the transceiver connector 704a and the cable 704, thus allowing the use of the optical transceiver device 300 to transmit optical data signals via the cable 704. As such, the first gravity-actuated laser shield element 316a and the second gravity-actuated laser shield element 316b allows for the gravity-actuated blocking of the laser emitted by the laser subsystem 304 in different orientations of the optical transceiver device 300 that may result from the connection of the optical transceiver device 300 to differently oriented ports.

Figure 9B:
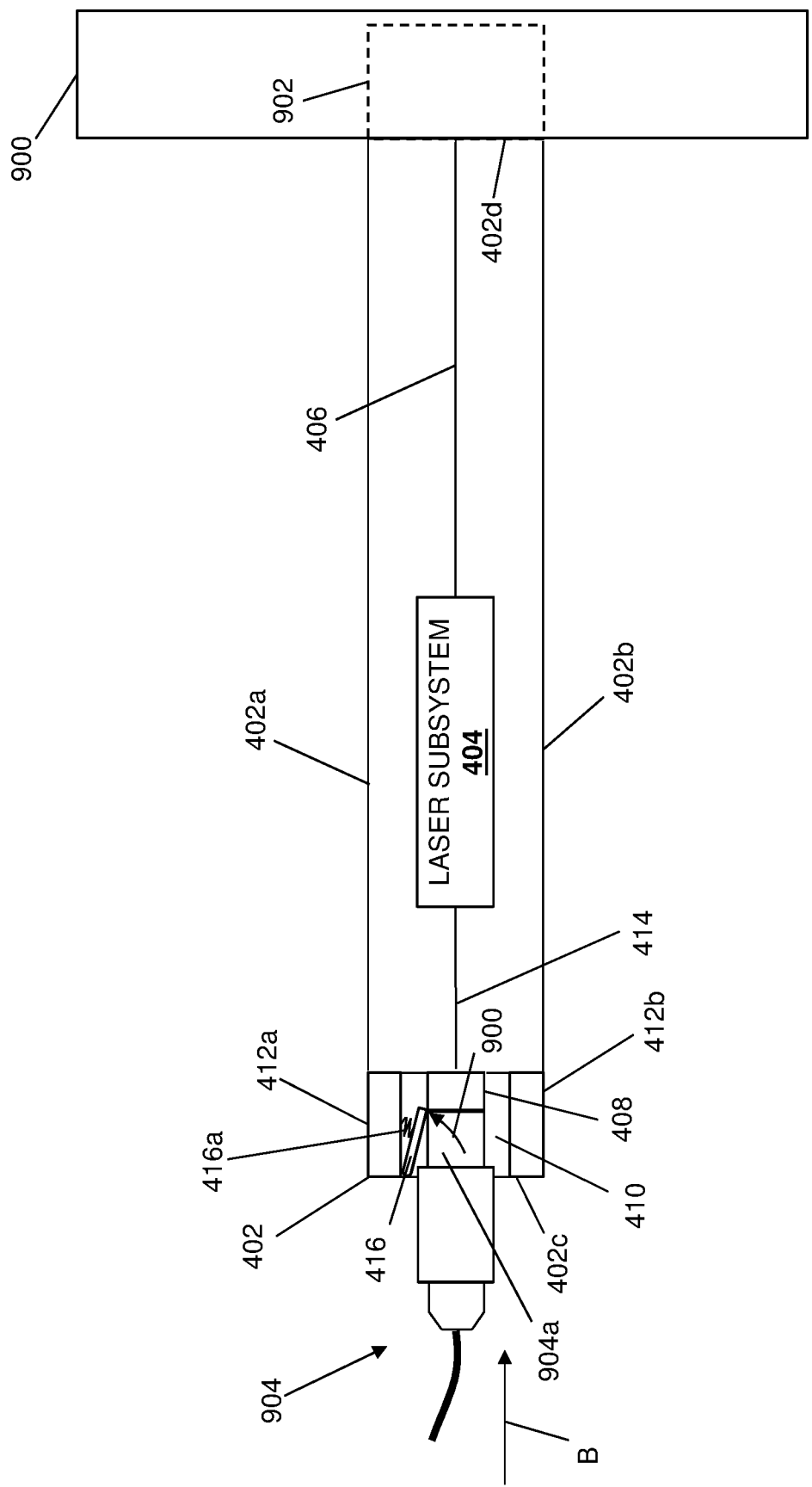
FIG. 9B is a schematic view illustrating an embodiment of the optical transceiver device of FIGS. 4A and 4B operating during the method of FIG. 5.

Similarly, with reference to FIG. 9A, a cable 904 including a transceiver connector 904a may be positioned adjacent the optical transceiver device 400 such that the transceiver connector 904a is located adjacent the front surface 402c of the optical transceiver chassis 402 and aligned with the cable connector 408 on the optical transceiver device 400. As illustrated in FIG. 9B, the transceiver connector 904a may then be moved in a direction B such that the transceiver connector 904a engages the cable connector 408.

As will be appreciated by one of skill in the art in possession of the present disclosure, the engagement of the transceiver connector 904a with the cable connector 408 may begin with the engagement of the transceiver connector 904a with the resiliently-biased laser shield element 416 as the transceiver connector 904a is moved in the direction B. Continued movement of the transceiver connector 904a in the direction B will then cause the transceiver connector 904a to move the resiliently-biased laser shield element 416 and overcome the biasing force provided by the resilient member 416a such that the resiliently-biased laser shield element 416 pivots about its connection to the optical transceiver chassis wall 412a(as illustrated by element 900 in FIG. 9B) in order to allow the transceiver connector 904a to move through the cable connector housing 410 and secure to the cable connector 408 on the optical transceiver device 400. As will be appreciated by one of skill in the art in possession of the present disclosure, the securing of the transceiver connector 904a to the cable connector 408 allows the laser emitted by the laser subsystem 404 to be provided via the optical data signal transmission element 408g on the cable connector 408 and through fiber optic cables in the transceiver connector 904a and the cable 904, thus allowing the use of the optical transceiver device 400 to transmit optical data signals via the cable 904.

Figure 10B:
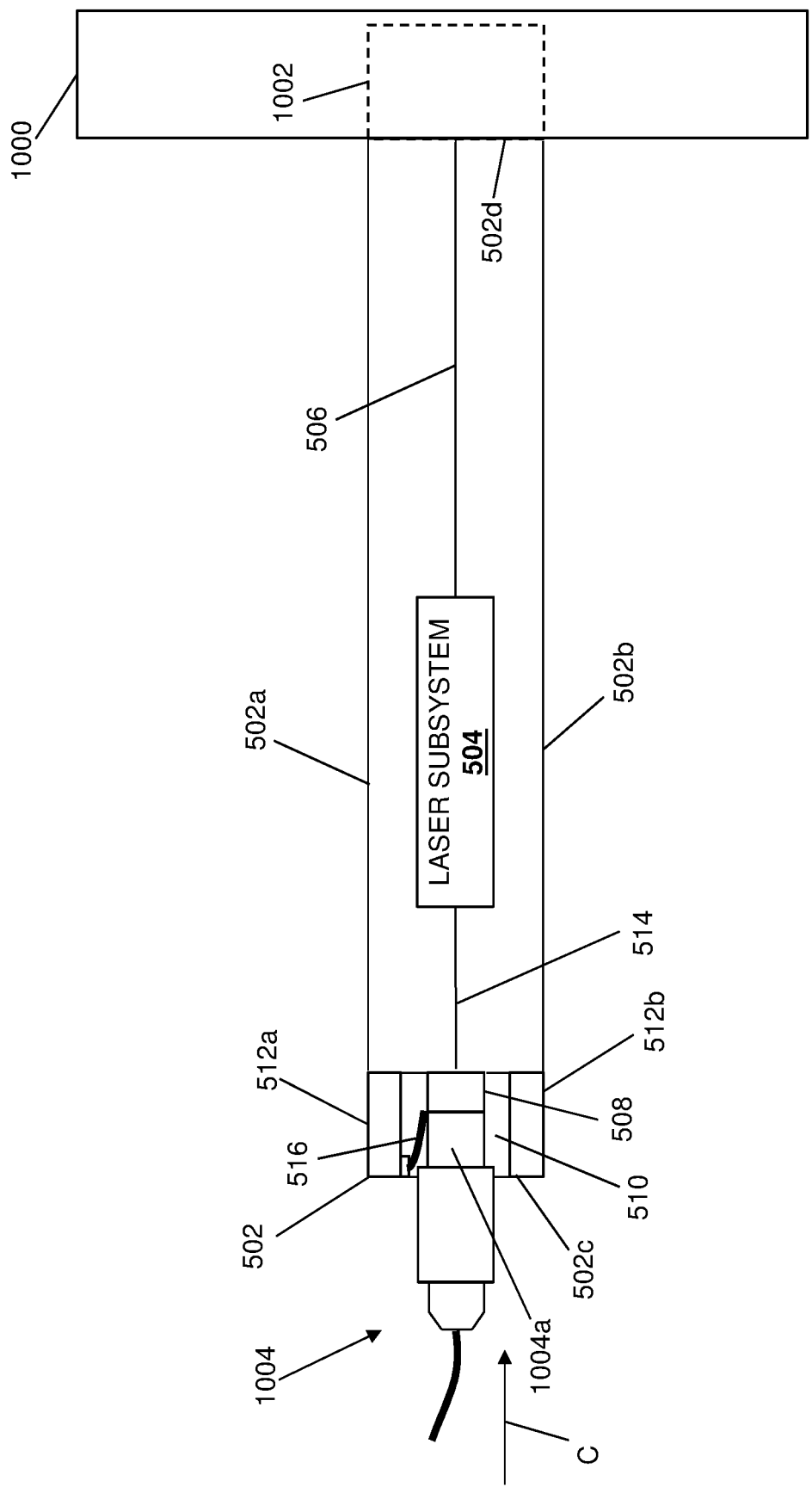
FIG. 10B is a schematic view illustrating an embodiment of the optical transceiver device of FIGS. 5A and 5B operating during the method of FIG. 5.

Similarly, with reference to FIG. 10A, a cable 1004 including a transceiver connector 1004a may be positioned adjacent the optical transceiver device 500 such that the transceiver connector 1004a is located adjacent the front surface 502c of the optical transceiver chassis 502 and aligned with the cable connector 508 on the optical transceiver device 500. As illustrated in FIG. 10B, the transceiver connector 1004a may then be moved in a direction C such that the transceiver connector 1004a engages the cable connector 508.

As will be appreciated by one of skill in the art in possession of the present disclosure, the engagement of the transceiver connector 1004a with the cable connector 508 may begin with the engagement of the transceiver connector 1004a with the deformable laser shield element 516 as the transceiver connector 1004a is moved in the direction C. Continued movement of the transceiver connector 1004a in the direction C will then cause the transceiver connector 1004a to move the resiliently-biased laser shield element 516 and deform the resiliently-biased laser shield element 516 in order to allow the transceiver connector 1004a to move through the cable connector housing 510 and secure to the cable connector 508 on the optical transceiver device 500. As will be appreciated by one of skill in the art in possession of the present disclosure, the securing of the transceiver connector 1004a to the cable connector 508 allows the laser emitted by the laser subsystem 504 to be provided via the optical data signal transmission element 508g on the cable connector 508 and through fiber optic cables in the transceiver connector 1004a and the cable 1004, thus allowing the use of the optical transceiver device 500 to transmit optical data signals via the cable 1004.

The method 600 then proceeds to decision block 610 where the method 600 proceeds depending on whether the cable has been disconnected from the cable connector on the optical transceiver device. If, at decision block 610, the cable has not been disconnected from the cable connector on the optical transceiver device, the method 600 returns to block 608. As such, the method 600 may loop such that the laser emitted by the laser subsystems 304/404/504 is provided to the cable 704/904/1004. If at decision block 610, the cable has been disconnected from the cable connector on the optical transceiver device, the method 600 returns to block 604 where the laser emitted by the laser subsystem in the optical transceiver device is blocked.

For example, with reference to FIGS. 7A and 7B, or 8A, 8B, and 8C, the transceiver connector 704a may be moved opposite the direction A such that the transceiver connector 704a disengages the cable connector 308. As will be appreciated by one of skill in the art in possession of the present disclosure, the disengagement of the transceiver connector 704a from the cable connector 308 and the removal of the transceiver connector 704a from the cable connector housing 310 allows the first gravity-assisted laser shield element 316a or the second gravity-assisted laser shield element 316b to return to the blocking orientation to block the laser emitted by the laser subsystem 304. As such, in response to the disconnection of the cable 704 from the optical transceiver device 300, one of skill in the art in possession of the present disclosure will appreciate how the laser emitted by the laser subsystem 304 will be blocked by the first gravity-assisted laser shield element 316a or the second gravity-assisted laser shield element 316b, thus eliminating the possibility of the laser emitted by the laser subsystem 304 escaping the optical transceiver device 300 and presenting a danger to the eyes of users.

Similarly, with reference to FIGS. 9A and 9B, the transceiver connector 904a may be moved opposite the direction B such that the transceiver connector 904a disengages the cable connector 408. As will be appreciated by one of skill in the art in possession of the present disclosure, the disengagement of the transceiver connector 904a from the cable connector 408 and the removal of the transceiver connector 904a from the cable connector housing 410 allows the resiliently-biased laser shield element 416 to return to the blocking orientation (due to the biasing force from the resilient member 416a) to block the laser emitted by the laser subsystem 404. As such, in response to the disconnection of the cable 904 from the optical transceiver device 400, one of skill in the art in possession of the present disclosure will appreciate how the laser emitted by the laser subsystem 404 will be blocked by the resiliently-biased laser shield element 416, thus eliminating the possibility of the laser emitted by the laser subsystem 404 escaping the optical transceiver device 400 and presenting a danger to the eyes of users.

Similarly, with reference to FIGS. 10A and 10B, the transceiver connector 1004a may be moved opposite the direction C such that the transceiver connector 1004a disengages the cable connector 508. As will be appreciated by one of skill in the art in possession of the present disclosure, the disengagement of the transceiver connector 1004a from the cable connector 508 and the removal of the transceiver connector 1004a from the cable connector housing 510 allows the deformable laser shield element 516 to return to the blocking orientation to block the laser emitted by the laser subsystem 504. As such, in response to the disconnection of the cable 1004 from the optical transceiver device 500, one of skill in the art in possession of the present disclosure will appreciate how the laser emitted by the laser subsystem 504 may be blocked by the deformable laser shield element 516, thus eliminating the possibility of the laser emitted by the laser subsystem 504 escaping the optical transceiver device 500 and presenting a danger to the eyes of users.

Thus, systems and methods have been described that provide a laser shield system in an optical transceiver device that blocks a laser emitted by a laser subsystem in the optical transceiver device when no cable is connected to the optical transceiver device, while being movable in response to engagement with a transceiver connector on a cable to allow the connection of the cable to the optical transceiver device. For example, the laser shield subsystem may include a gravity-actuated laser shield element that is moved into a blocking orientation in response to gravitational forces to block a laser emitted by a laser subsystem in the optical transceiver device, while moving in response to engagement with a transceiver connector on a cable to allow the cable to be connected to the optical transceiver device. In another example, the laser shield subsystem may include a resiliently-biased laser shield element that is biased into a blocking orientation by a resilient member to block a laser emitted by a laser subsystem in the optical transceiver device, while moving in response to engagement with a transceiver connector on a cable to allow the cable to be connected to the optical transceiver device. In another example, the laser shield subsystem may include a deformable laser shield element that blocks a laser emitted by a laser subsystem in the optical transceiver device, while deforming in response to engagement with a transceiver connector on a cable to allow the cable to be connected to the optical transceiver device. As such, the laser emitted by the laser subsystem in the optical transceiver device is blocked when no cable is connected the cable connector on the optical transceiver device, thus eliminating the possibility of a laser produced by the laser subsystem escaping the optical transceiver device and presenting a danger to the eyes of users.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An optical transceiver system, comprising:
   an optical transceiver chassis including a cable connector;
   a laser subsystem that is included in the optical transceiver chassis; and
   a laser shield system that is included on the optical transceiver chassis and adjacent the cable connector, wherein the laser shield system includes a first laser shield element that is moveably coupled to the optical transceiver chassis on a first side of the cable connector, wherein the first laser shield element is configured to:
      move, in response to a gravity force when the optical transceiver chassis is provided in a first orientation, into a blocking orientation that blocks a laser emitted by the laser subsystem when no cable is connected to the cable connector
      move, in response to engagement with a transceiver connector on a cable, in order to allow the transceiver connector to connect to the cable connector; and
      move, in response to the gravity force when the optical transceiver chassis is provided in a second orientation, into a non-blocking orientation that does not block the laser emitted by the laser subsystem.

2. The system of claim 1, wherein the laser shield system includes:
   a second laser shield element that is moveably coupled to the optical transceiver chassis on a second side of the cable connector that is opposite the first side of the cable connector, wherein the second laser shield element is configured to:
      move, in response to the gravity force when the optical transceiver chassis is provided in the second orientation, into a blocking orientation that blocks the laser emitted by the laser subsystem; and
      move, in response to the gravity force when the optical transceiver chassis is provided in the first orientation, into a non-blocking orientation that does not block the laser emitted by the laser subsystem.

3. The system of claim 1, wherein the laser subsystem is configured to:
   emit the laser in response to the optical transceiver chassis being connected to a port.

4. The system of claim 1, wherein the optical transceiver chassis is a Small Form-factor Pluggable (SFP) optical transceiver chassis.

5. An Information Handling System (IHS), comprising:
   a first optical connector;
   a laser subsystem that is configured to emit a laser from the first optical connector; and
   a laser shield system that is located adjacent the first optical connector and that includes a first laser shield element that is located on a first side of the first optical connector, wherein the first laser shield element is configured to:
      move, in response to a gravity force when the laser shield system is provided in a first orientation, into a blocking orientation that blocks the laser emitted by the laser subsystem, when no cable is connected to the first optical connector;
      move, in response to engagement with a second optical connector on a cable, in order to allow the second optical connector to connect to the first optical connector; and
      move, in response to the gravity force when the laser shield system is provided in a second orientation, into a non-blocking orientation that does not block the laser emitted by the laser subsystem.

6. The IHS of claim 5, wherein the laser shield system includes:
   a second laser shield element that is located on a second side of the first optical connector that is opposite the first side of the first optical connector, wherein the second laser shield element is configured to:
      move, in response to the gravity force when the laser shield system is provided in the second orientation, into a blocking orientation that blocks the laser emitted by the laser subsystem; and
      move, in response to the gravity force when the laser shield system is provided in the first orientation, into a non-blocking orientation that does not block the laser emitted by the laser subsystem.

7. The IHS of claim 5, wherein the laser subsystem is configured to:
   emit the laser in response to being coupled to a port.

8. A method for operating an optical transceiver device, comprising:
   emitting, by a laser subsystem that is included in an optical transceiver device via a cable connecter included on the optical transceiver device, a laser;
      moving, by a first laser shield element in a laser shield system that is movably coupled to the optical transceiver device adjacent to and on a first side of the cable connector in response to a gravity force when the optical transceiver device is provided in a first orientation, into a blocking orientation that blocks the laser emitted by the laser subsystem when no cable is connected to the cable connector;
      moving, by the laser shield element in response to engagement with a transceiver connector on a cable, in order to allow the transceiver connector to connect to the cable connector; and
   moving, by the first laser shield element in response to the gravity force when the optical transceiver device is provided in a second orientation, into a non-blocking orientation that does not block the laser emitted by the laser subsystem.

9. The method of claim 8, wherein the laser shield system includes:
   a second laser shield element that is moveably coupled to the optical transceiver device on a second side of the cable connector that is opposite the first side of the cable connector, wherein the method further comprises:
      moving, by the second laser shield element in response to the gravity force when the optical transceiver device is provided in the second orientation, into a blocking orientation that blocks the laser emitted by the laser subsystem; and
      moving, by the second laser shield element in response to the gravity force when the optical transceiver device is provided in the first orientation, into a non-blocking orientation that does not block the laser emitted by the laser subsystem.

10. The method of claim 8, wherein the laser shield system includes:
    a laser shield element; and a resilient member that is coupled to the laser shield element, wherein the method further comprises:
providing, by the resilient member, a biasing force that biases the laser shield element into a blocking orientation that blocks the laser emitted by the laser subsystem, wherein the engagement with the transceiver connector on the cable overcomes the biasing force to allow the transceiver connector to connect to the cable connector.

11. The method of claim 8, wherein the method further comprises:
emitting, by the laser subsystem, the laser in response to the optical transceiver device being connected to a port.

12. The method of claim 8, wherein the optical transceiver device is a Small Form-factor Pluggable (SFP) optical transceiver device.

* * * * *